(12) United States Patent
Van Phan et al.

(10) Patent No.: US 9,357,584 B2
(45) Date of Patent: May 31, 2016

(54) DUAL IN-BAND/OUT-BAND RADIO ACCESS SYSTEM FIELD

(75) Inventors: Vinh Van Phan, Oulu (FI); Kari Veikko Horneman, Oulu (FI); Simone Redana, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/009,991

(22) PCT Filed: Apr. 6, 2011

(86) PCT No.: PCT/EP2011/055348
§ 371 (c)(1),
(2), (4) Date: Oct. 21, 2013

(87) PCT Pub. No.: WO2012/136253
PCT Pub. Date: Oct. 11, 2012

(65) Prior Publication Data
US 2014/0045491 A1   Feb. 13, 2014

(51) Int. Cl.
| | |
|---|---|
| *H04W 88/04* | (2009.01) |
| *H04W 84/00* | (2009.01) |
| *H04W 36/14* | (2009.01) |
| *H04W 68/12* | (2009.01) |
| *H04W 88/06* | (2009.01) |
| *H04W 88/10* | (2009.01) |

(52) U.S. Cl.
CPC .............. *H04W 88/04* (2013.01); *H04W 36/14* (2013.01); *H04W 68/12* (2013.01); *H04W 84/005* (2013.01); *H04W 88/06* (2013.01); *H04W 88/10* (2013.01)

(58) Field of Classification Search
CPC .............. H04W 84/005; H04W 88/10; H04W 72/0406; H04W 72/042; H04W 72/082; H04W 24/02; H04L 5/0055; H04L 1/08; H04L 1/1829; H04L 5/14; H04B 1/711
USPC .............. 455/426.1, 11.1; 370/328, 329, 336, 370/315
See application file for complete search history.

(56) References Cited

U.S. PATENT DOCUMENTS

| | | | |
|---|---|---|---|
| 2005/0094608 A1 | 5/2005 | Yokota | 370/338 |
| 2013/0322324 A1* | 12/2013 | Kim et al. | 370/315 |
| 2013/0329711 A1* | 12/2013 | Seo et al. | 370/336 |

FOREIGN PATENT DOCUMENTS

WO  WO 2008/084394 A2  7/2008

OTHER PUBLICATIONS

Irvine, J., et al., "System architecture for the MOSTRAIN project (mobile services for high speed trains", May 4-7, 1997 Vehicular Technology Conference, 1997, IEEE 47th (vol. 3), abstract only.

(Continued)

*Primary Examiner* — Phuoc H Doan
(74) *Attorney, Agent, or Firm* — Harrington & Smith (57) ABSTRACT

There is provided a system of interacting relay nodes, each being configured to provide an in-band cellular radio access and an out-band radio access for at least one user equipment within the coverage area of a corresponding relay node via at least one in-band cellular radio access link and at least one out-band radio access link, respectively; to transmit user data related to the in-band cellular radio access via first cellular radio access backhaul link and user data related to the out-band radio access via a second cellular radio access backhaul link; and to communicate with the at least one other relay node in order to per-form at least radio control-related functionalities between the interconnected relay nodes.

27 Claims, 4 Drawing Sheets

(56) References Cited

OTHER PUBLICATIONS

Irvine, J. et al.; "System architecture for the MOSTRAIN project (mobile services for high speed trains"; May 4-7, 1997; Vehicular Technology Conference, 1997, IEEE 47$^{th}$ (vol. 3); whole document (5 pages); ISBN 978-0-7803-3659-9.

Utler, K.; "Besserer Mobilfunk im Zug"; NTZ (Nachrichtentechnische Zeitschri FT), vol. 52, No. 9; Jan. 1, 1999; pp. 62-63.

* cited by examiner

DUAL IN-BAND/OUT-BAND RADIO ACCESS SYSTEM FIELD

The invention relates generally to mobile communication networks. More particularly, the invention relates to relay nodes deployed in a moving vehicle, such as in high speed trains.

BACKGROUND

In radio communication networks, such as the Long Term Evolution (LTE) or the LTE-Advanced (LTE-A) of the 3$^{rd}$ Generation Partnership Project (3GPP), network planning comprises the use of common base stations (Node B, NB). The base stations may not provide sufficient data rate, capacity and/or coverage for users in specific circumstances, such as at the cell edge, or for users moving at high speeds. Therefore, it is common to use relay nodes to relay/forward data between the users and the base station.

However, several problems are related to the use of relay nodes when user equipment (UE) is located in high density and moving. Thus, it is important to provide a solution for reliably serving UEs.

BRIEF DESCRIPTION OF THE INVENTION

Embodiments of the invention seek to improve the solution for reliably serving UEs.

According to an aspect of the invention, there are provided methods as specified in claims 1, 11 and 12.

According to an aspect of the invention, there are provided apparatuses as specified in claims 13, 23 and 24.

According to an aspect of the invention, there is provided a system as specified in claim 25.

According to an aspect of the invention, there are provided computer program products as specified in claims 27, 28 and 29.

Embodiments of the invention are defined in the dependent claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Radio communication networks, such as the Long Term Evolution (LTE) or the LTE-Advanced (LTE-A) of the 3$^{rd}$ Generation Partnership Project (3GPP), are typically composed of at least one base station (also called a base transceiver station, a Node B, or an evolved Node B, for example), a user equipment (also called a user terminal and a mobile station, for example) and optional network elements that provide the interconnection towards the core network. The base station connects the UEs via the so-called radio interface to the network.

Figure 1:
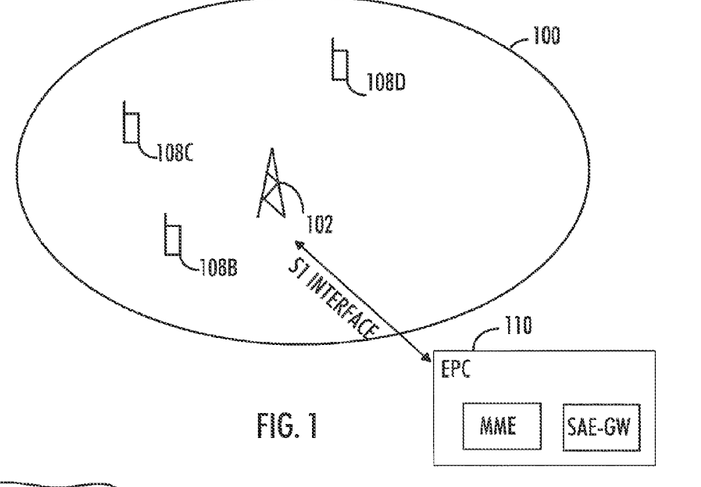
FIG. 1 presents a communication network.

FIG. 1 shows a communication network, according to an embodiment. As explained, the communication network may comprise a base station 102. The base station 102 may provide radio coverage to a cell 100, control radio resource allocation, perform data and control signaling, etc. The cell 100 may be a macrocell, a microcell, or any other type of cell where radio coverage is present. Further, the cell 100 may be of any size or form, depending on the antenna system utilized.

In general, a base station 102 applicable to the embodiments may be configured to provide communication services according to at least one of the following communication protocols: Worldwide Interoperability for Microwave Access (WiMAX), Universal Mobile Telecommunication System (UMTS) based on basic wideband-code division multiple access (W-CDMA), high-speed packet access (HSPA), LTE, and/or LTE-A. The base station 102 may additionally provide the second generation cellular services based on GSM (Global System for Mobile communications) and/or GPRS (General Packet Radio Service). The present embodiments are not, however, limited to these protocols.

The base station 102 may be used in order to provide radio coverage to the cell 100. The base station 102 may be seen as one communication point of the network. The base station 102 may be node B, evolved node B (eNB) as in LTE-A, a radio network controller (RNC), or any other apparatus capable of controlling radio communication and managing radio resources within the cell 100. The base station 102 may also have an effect on mobility management by controlling and analyzing radio signal level measurements performed by a user terminal, carrying out its own measurements and performing handover based on the measurements.

For the sake of simplicity of the description, let us assume that the base station is an eNB. The development of the evolved universal mobile telecommunications system (UMTS) terrestrial radio access network (E-UTRAN), which is the air interface of the LTE, is concentrated on the eNB 102. All radio functionality is terminated here so that the eNB 102 is the terminating point for all radio related protocols. The E-UTRAN may be configured such that orthogonal frequency division multiple access (OFDMA) is applied in downlink transmission, whereas single carrier frequency division multiple access (SC-FDMA) may be applied in uplink, for example. In the case of multiple eNBs in the communication network, the eNBs may be connected to each other with an X2 interface as specified in the LTE.

The eNB 102 may be further connected via an S1 interface to an evolved packet core (EPC) 110, more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles user plane functions including packet routing and forward-ing, E-UTRAN idle mode packet buffering, etc. The user plane bypasses the MME plane directly to the SAE-GW. The SAE-GW may comprise two separate gateways: a serving gateway (S-GW) and a packet data network gateway (P-GW). The MME controls the tunneling between the eNB and the S-GW, which serves as a local anchor point for the mobility between different eNBs, for ex-ample. The S-GW may relay the data between the eNB and the P-GW, or buffer data packets if needed so as to release them after appropriate tunneling has been established to a corresponding eNB. Further, the MMEs and the SAE-GWs may be pooled so that a set of MMEs and SAE-GWs may be as-signed to serve a set of eNBs. This means that an eNB may be connected to multiple MMEs and SAE-GWs, although each user terminal is served by one MME and/or S-GW at a time.

According to an embodiment, the eNB 102 may establish a connection with a user equipment (UE) 108B to 108D such as a mobile user terminal, a palm computer, or any other apparatus capable of operating in a mobile communication network. That is, the UE 108B to 108D may perform data communication with the eNB 102.

In addition to the above mentioned cellular radio access technologies (RAT), the UE may benefit from the existence of a wireless local area network (WLAN), such as WiFi, in order to apply internet protocol (IP) services. The WiFi radio access may be provided by a WLAN base station established in the premises. The WLAN base station may be connected via wire or wirelessly to a core network which accesses the Internet, for example. Such a WLAN base station may be deployed on public transportation vehicles, such as buses, trains, cruise ships, etc., on behalf of the vehicle administrator, for example. The users onboard may thus access the cellular radio access, such as the LTE or the LTE-A, or the non-cellular radio access, such as the WiFi.

Relay nodes (RN) may be deployed on the vehicle so that the UEs stay relatively static with respect to the RN, whereas the link that suffers from the high speeds is the cellular wireless link between the RN and the donor cellular system(s) which is (are) changing time-to-time due to mobility of the RN. This link may be called a relay link or a backhaul link, whereas the link from the relay node to the UE may be called an access link. Therefore, the UEs aboard may be seen as sharing the same mobility characteristics from the macro donor system and being rather stationary within the local cell of the RN.

It is common that the speed of the vehicles, such as high speed trains, may be several hundred kilometers per hour. This causes problems with respect to providing and ensuring sufficiently high data rates for the wireless backhaul connections. This is also subject to a fair sharing of limited radio resources of the donor cellular system(s) with other regular mobile users.

Additionally, challenges of this type of moving relay (MR) deployment relate to the need for the RN (or a group of RNs) to support all UEs aboard, regardless of their associated home operators, also referred to as the multi-operator problem. This is because operators are often competing with each other in overlapping service areas and therefore imposing restrictions, such as forcing individual UEs to select its home network. In this regard, the deployed RN system may be seen as of common interest or third party to all involved and supporting operators' networks. Note that, as the RN (or group of RNs deployed) may be traveling crossing cities or countries, a robust cell configuration scheme against all possible changes of donor cellular systems and automatic neighbor-cell relation (ANR) along the travelling road is highly desirable. This is because a change in the basic cell configuration, such as a carrier spectrum allocation or a physical cell identity (layer 1 cell ID), due to possible conflicts with target donor cells and the ANR thereof may result in a cell reset or reconfiguration that affects all UEs in the cell. Therefore, these situations need to be avoided as much as possible. Furthermore, some particular requirements need to be taken into account in relation to backward compatibility. In particular, an LTE UE (in comparison to an LET-A UE) needs to be able to access LTE-A systems and vice versa.

Figure 2:
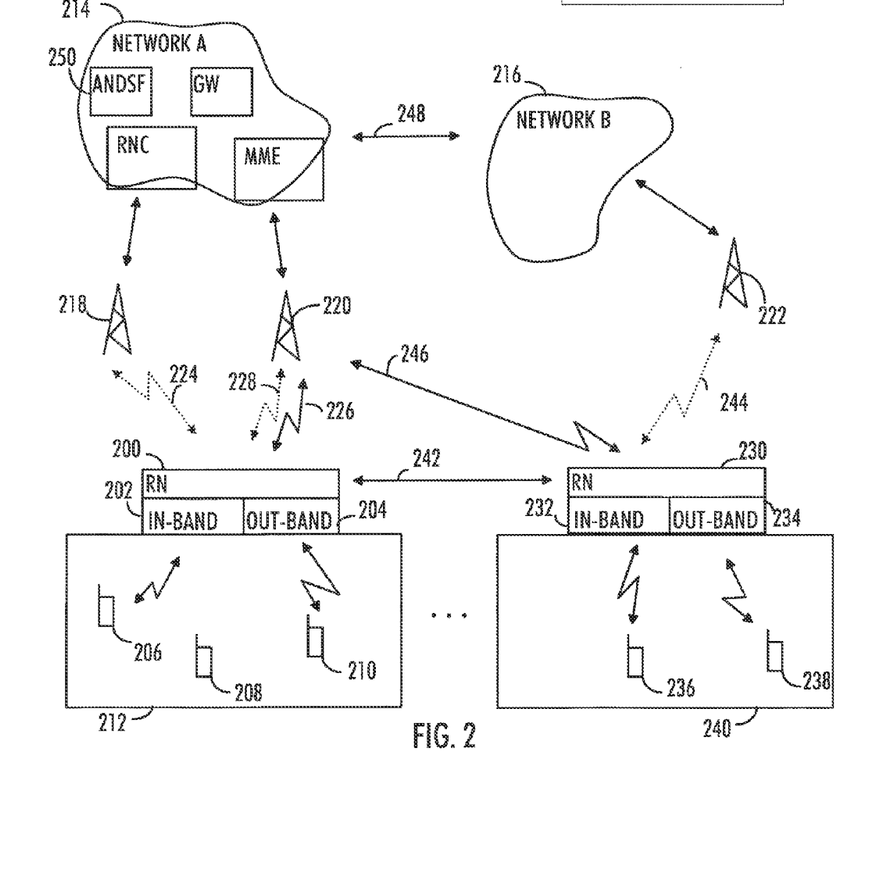
FIG. 2 shows another communication network according to an embodiment.

In order to reliably serve UEs, there is provided an apparatus, such as a relay node, which provides an in-band cellular radio access and an out-band radio access for at least one UE within the coverage area via at least one in-band cellular radio access link and at least one out-band radio access link, respectively. This is shown in FIG. 2, where a relay node 200 is capable of providing the in-band cellular radio access 202 and the out-band radio access 204. In an embodiment, the in-band cellular radio access 202 is a GSM, UMTS, LTE or LTE-A radio access. In an embodiment, the out-band radio access 204 is a WLAN radio access, such as the WiFi. In general, the in-band cellular radio access 202 operates on another carrier, different from the one used by the out-band radio access 204. According to an embodiment, the RN 200 provides the two different RATs simultaneously (dual in-band/out-band RATs). The RN 200 may be equipped with the required elements to perform communication on two separate bands of frequency.

The out-band radio access in parallel with the in-band cellular access not only allows for efficient utilization of the existing out-band RATs and spectrum resources thereof but also enhances reliability and robustness of the in-band RAT. The latter is due to uncertainties and possible conflicts in basic cell configurations upon changing donor cellular systems 214 and 216 as the RN 200 moves from one cell to another or within overlapping coverage of donor cellular systems 214 and 216 from different operators. The high data rate on a backhaul link carrying out-band user data is ensured because the resources on this backhaul link need not be shared with the resources on the access link between the RN and the served UE. Furthermore, flexible on-board IP access service model may be obtained. For instance, a basic free WiFi may be offered to all mobile users aboard and regular cellular relay services with a possible WiFi offload (to be explained later) may be provided. In addition, an advanced on-demand autonomous bit-rate boosted dual radio access may be on offer to both WiFi and cellular active users which are capable of using such service (advanced UEs).

In FIG. 2, the UEs 206, 208 and 210 are within the coverage area of the RN 200. In an embodiment, the UEs 206 to 210 may be located in a car 212 of a train and the RN 200 is deployed in the car 212. Thus, the train on the move causes the relay node 200 to move with respect to any donor cellular system 214 and 216 to which the RN 200 may be connected to via at least one respective base station 218, 220, 222. The donor cellular system 214 may be operated by an operator A and the donor cellular system 216 may be operated by another operator B.

The network (the donor cellular system) 214 of the operator A may, in this region, be equipped with two different base stations 218 and 220. The base station 218 may be a UMTS base station communication with the core network 214 via a radio network controller (RNC). The second base station 220 may be an eNB and, thus, capable of operating with the core network 214 without a separate RNC element. The eNB 220 performs control plane communication via the MME, whereas the user plane data bypasses the MME straight to the gateway (GW). In the example of FIG. 2, the network 216 of the operator B is equipped with a single eNB 222.

In an embodiment, the relay node 200 stores information elements which inform that the out-band radio access is being provided in addition to the in-band cellular radio access. The stored information elements may be communicated with the connected donor cellular system so that the system, either 214 or 216, obtains knowledge of such relay node capable of providing the dual in-band/out-band communication to the UEs in the local cell of the RN 200.

For instance when the dual in-band/out-band RN is switched on or reactivated, the information elements may be communicated with the initially selected donor system, for example 214, in order to establish at least one backhaul link 224 to 228. In case there are many RNs (to be explained later), the RN 200, for example, may also need to fetch configurations to set up the system of interconnected RNs. This is because, self-operating network and flexible spectrum use may require on-the-run dynamic deployment and optimization of the relay node system with smart reactivation and deactivation of relay nodes and cell thereof, donor eNB selection and reselection, UE idle and active mobility management, etc.

Further, in an embodiment, the information about the availability of the out-band radio access in addition to the in-band cellular radio access is communicated to the at least one user equipment. The stored information elements may be, for example, broadcasted in the local cell (in the case of FIG. 2, the local cell may denote the car 212) so that UEs in the coverage area find out that such dual RAT system is available for use.

In other words, information about the availability of the out-band radio access in addition to the in-band cellular radio access is provided to at least one of the following: at least one user equipment 206 to 210, 236 to 238 and at least one donor cellular system 214, 216. The information of availability may also comprise information of the capability and status of the out-band radio access and/or to the in-band cellular radio access. Thus, it can be informed is the in-band radio access connectable at this point (is it suspended), what is the configuration of the out-band radio access interface, etc.

The use of relays has been introduced in the LTE-A. Thus, eNBs of the LTE-A are capable of communicating with the relay nodes whereas GSM base stations or NBs of the LTE may be limited to WiFi data communication. Therefore, from FIG. 2, it can be seen that the LTE NB 218 has a backhaul link 224 only for the WiFi communication (dotted line) representing the out-band radio access data transfer, whereas the eNB 220 handles both the in-band cellular radio access data and the WiFi (out-band) data via links 226 and 228, respectively. It may be the case that UE 206 is applying the in-band cellular radio access whereas the user 210 is applying the out-band radio access and thus separate backhaul links for the data transfer is needed. In FIG. 2, it is assumed that UE 208 is, for example, in idle mode.

In an embodiment, the RN 200 may transmit user data related to the in-band cellular radio access via a first cellular radio access backhaul link, for example, the link 226, and user data related to the out-band radio access via a second cellular radio access backhaul link, for example, the link 224 and/or 228, to at least one donor cellular system, such as to the network 214. Thus, both the in-band and the out-band data is forwarded to the donor cellular system 214 or 216 via respective mobile cellular backhaul links. Thus, the RN 200 may need to establish two cellular backhaul links, one for the WiFi data and another for the cellular in-band data. Physically both links can be transmitted either over the same shared physical channel of a donor eNB in the case provided by the same donor eNB, or over different physical channels which are provided by different eNBs.

In an embodiment, as shown in FIG. 2, there exists another RN 230 in car 240 of the train, wherein the RN 230 is also capable of providing such dual in-band/out-band radio access via respective in-band 232 and out-band 234 transceiver elements. Thus the relay node 230 has the same functionalities as RN 200. In this case, there exists a system comprising at least two interconnected relay nodes, each being configured to provide the in-band cellular radio access and the out-band radio access for at least one user equipment within the coverage area of a corresponding relay node via at least one in-band cellular radio access link and at least one out-band radio access link, respectively. Each relay node may also transmit user data related to the in-band cellular radio access via a first cellular radio access backhaul link and user data related to the out-band radio access via a second cellular radio access backhaul link, as shown in FIG. 2.

The RN 230 may transmit the WiFi out-band data on a cellular backhaul link 244 towards the network 216 served by the eNB 222 and the cellular in-band data via cellular backhaul link 246 towards the network 214 served by the eNB 220. The reason why the in-band data may be forwarded to the eNB 220 of the cellular donor system 214 may be that a UE 236 onboard in the car 240 uses the network of the operator A, for example. A UE 238 may use the network 216 of the operator B and the data (for example, WiFi data) may thus be forwarded to the eNB 222 by the RN 230. Thus, it is clear that multi-operator related issues may cause further backhaul links being established by the RN 200 or 230. Further, there may be users roaming in the train and those users need to be taken care as well. Also in this case it may be that many backhaul links are needed to different operator networks.

This kind of system of interconnected relay nodes 200, 230 may also be called a moving relay (MR) system. The number of RNs in the MR system is unlimited. In an embodiment, there is a single RN in each of, let's say, 20 cars of a train, thereby resulting in 20 RNs being comprised in the MR system.

Moreover, each relay node may interact with the at least one other relay node in the system in order to perform at least radio control -related functionalities between the interconnected relay nodes of the system. The interaction may comprise communication that may take place via a communication link 242. The link 242 may be wired or wireless. The radio control -related functionalities that may need to be communicated between the interconnected relay nodes 200 and 230 may comprise at least one of the following: pre-notifying that handoff is to take place (see FIG. 4), distributing updated system information and control signaling of the at least one donor system, offloading at least one user equipment communicating on the in-band cellular radio access to the out-band radio access, and traffic balancing between the interconnected relay nodes.

The distribution of updated system information and other control signaling is advantageous so that the other RNs obtain this information via the communication link 242. Thus, the other backhaul links from the donor cellular systems and the other interconnected relay nodes do not need to use their limited capacity in communicating the information to the other interconnected relay nodes. Traffic balancing may be for example such that the UE 206, currently served by the RN 200, is handed over to another interconnected relay node 230, provided that the UE 200 is within the range of RN 230. In an embodiment, the user data from the UE 206 is forwarded from the RN 200 to the RN 230 via the communication link 242 and the RN 230 may then forward the user data to the eNB 222 or to the eNB 220. This embodiment allows efficient traffic balancing if the backhaul link(s) from the RN 200 is (are) highly loaded.

In this regard, the system of interconnected nodes may be considered as a class of cellular integrated or supported relay nodes having profile characteristics, capabilities or mobile contexts which include certain information about dual in-band/out-band RATS as well as multi-operator coordinated and cooperative backhauling needs, capabilities and restrictions of the MR system. In other words, the relay system is considered to be under full control and management of the donor cellular system(s) 214 and/or 216, wherein the in-band users share the same radio resources and provide the same cellular access modes as the stationary mobile users of the donor cellular system(s) 214 and/or 216. In order to enable the co-operative and coordinated control of the MR system in the moving vehicle, the donor cellular systems 214 and 216 may communicate with each other via a communication link 248. The donor system 214, 216 may thus coordinate and control the mobile cellular backhaul links, together with cooperation between the RNs 200, 230 inside the train via the interface 242. This facilitates in load-balancing and capacity sharing among the in-band and the out-band RATs, the RNs 200, 230 and local cells thereof. Moreover, connection and mobility management may be enhanced when compared to that of controlling the RNs 200, 230 separately.

As an example, the RNs may need to obtain information that reveals under which operator (A or B, for example) each UE within the local cell of the RN is operating. Then this information may be used in deciding which networks the RN needs to establish a backhaul connection to. This kind of information may be communicated between the MR system and the donor cellular systems 214 and 216 to facilitate self-operating network (SON) establishment and mobility functions and services related to the operation of such MR systems.

In an embodiment, the in-band cellular radio access may be temporarily suspended. The decision whether to suspend the cellular in-band RAT or not may depend on the sufficiency or the efficiency of the donor network 214 and/or 216 resources. Alternatively, suspension may be used to avoid problems related to some temporary conflict or collision in a network identity (such as a physical cell identity (PCID)) and/or spectrum resource allocation between at least one local RN cell and the targeted donor cell(s) 214 and/or 216. Suspension may also be conducted due to traffic load or for energy saving reason. The suspension advantageously may avoid otherwise resulting need to reset and reconfigure at least one of the local RN cells. In other words, the suspension is different from a cell reset or reconfiguration of, for example, frequency band or cell ID, after which the cell may appear as a new cell to all current users which may be active or idle or in discontinuous reception (DRX) state.

During the suspension, only the cellular access link (between the RN and the UE) is suspended, not the cellular backhaul connections between the RN and the connected base station/NB/eNB. Thus, the RN 200, 230 may maintain connection to at least one of the at least one cellular donor system 214 and 216 in order to obtain at least radio control-related services. Thus, the at least one of the donor cellular systems 214 and 216 may provide at least cellular management and control-plane services to the corresponding relay nodes comprised in the MR. The suspension may be performed per RN basis, that is, the suspension may affect only the RN 200 whereas the RN 230 still provides dual band RATs. Furthermore, the suspension may be per group of RN-basis. In other words, only some RNs may suspend the in-band cellular radio access temporarily, while other RNs do not suspend the in-band cellular radio access.

The suspension may be communicated to all involved donor systems. In an embodiment, the source or current serving donor system, or a central control entity, such as an access network discovery and selection function (ANDSF), may inform the target or other involved donor systems about the suspension when needed. Such a need may exist in a handover or in a reconfiguration or reallocation of backhaul links involving multiple donor systems, for example. This allows a network controlled informing of the suspension.

In another embodiment, the relay node may inform the other donor systems after being commanded to suspend its in-band cellular radio access operation temporarily. This option may provide benefits in that the communication link 248 need not be used.

The suspension is advantageous as, due to PCID the collision for example, only the cellular access link of mobile users between UEs and RN 200, 230 may be lost but not the backhaul links. Further, the out-band access link is unaffected. This is because the in-band relay is supposed to be fully compatible to LTE cellular access and using the same cellular access spectrum as that of the cellular backhaul link, whereas the out-band RAT is operating in a radio band separated from that of the cellular access and therefore needs not be changed due to the possible PCID collision. Further, the cellular in-band radio access is time-shared with the cellular backhaul link carrying the in-band data.

As an example it can be imagined that a train is currently in cell #1 of an operator operating within frequency f1 with PCID=100. The relay node deployed in the train is configured to operate likewise within frequency f1. Let us further assume that the cell identity of the local relay cell is PCID=10. As the train moves to another cell #k of the same operator somewhere along the route and the cell #k has the same PCID=10 as the local relay cell, a conflict may occur. The suspension may be used to avoid otherwise forced reconfiguration of PCID of the cell #k or of the relay cell. The reconfiguration might cause service disruption to all users in the affected cell and require a significant amount of signaling overhead. However, as the out-band radio access is operating on another frequency band f2, different from f1, the out-band users are unaffected by the suspension or collision. In other words, the frequency f2 need not be changed as the train moves from cell #1 to cell #k In an embodiment, the at least one cellular radio access backhaul link, otherwise carrying user data related to the in-band cellular radio access, is re-allocated, for the period of the suspension, to carry user data related to the out-band radio access. Thus, the backhaul link between the RN 200, 230 and donor eNB 220, 222 can still be maintained and, for example, handed over from one donor eNB to another donor base eNB which does not depend on the PCID. Therefore, the overall capacity of the system may be maintained.

In an embodiment, the at least one user equipment communicating on the in-band cellular radio access is informed that suspension of the in-band cellular radio access is to take place. This informing may take place either via common or dedicated signaling from the RNs 200, 230. The signaling may travel via the cellular in-band radio access link or via the out-band radio access link if done before hand, and via the out-band radio access link if done after the suspension. This option allows the low signaling overhead. Alternatively or in addition to, the informing may take place via dedicated signaling from the donor cell(s) 214, 216 upon cell reselection of mobile users aboard. A further option is that an access network discovery and selection function (ANDSF) 250 informs mobile users aboard of the in-band RAT suspension via a WiFi access, for example.

In an embodiment, it is the ANDSF which informs/controls suspension of RN cell and informs the corresponding UEs about the suspension. In an embodiment, the current serving donor cellular system may perform the controlling/informing. Thus, the ANDSF or other network element may decide whether or not to perform suspension of the in-band cellular radio access from the relay node, wherein the relay node provides the in-band cellular radio access and the out-band radio access. The respective element may then inform the relay node about the suspension of the in-band cellular radio access when the suspension is decided to be performed.

The decision on where to perform the control/informing may depend on whether multi-operator and/or multi-RAT issues are involved which require coordination from the ANDSF. Another factor is whether the UE is capable of communication with both available RATs (in-band and out-band RATs) or only with one of them.

Figure 3:
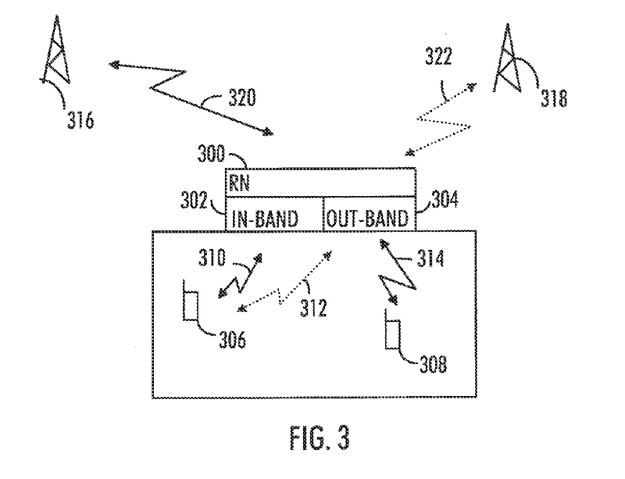
FIG. 3 shows offloading of a user equipment, according to an embodiment.

In FIG. 3, it is depicted that, according to an embodiment, at least one user equipment 306 communicating on the in-band cellular radio access 302 via a relay node 300 is offloaded (handed over) to the out-band radio access 304 before the suspension takes place. The on-going in-band communication is shown with solid line 310 and the connection to the out-band RAT 304 is shown with dotted line 312. This is advantageous solution as the out-band radio access 304 is unaffected by a possible suspension and therefore the UE 306 offloaded to the out-band RAT 304 need not terminate communication at all. The UE 308 already communicating with the out-band RAT 304 may remain connected to the out-band RAT 304 via communication link 314.

The cellular backhaul connection 320, originally connected to an eNB 316 which is affected by a collision of the PCIDs of the cell served by the eNB 316 and of the local RN cell, for example, may be re-directed to the eNB 318, which is unaffected by the collision. Thus, the redirected cellular backhaul connection 322 is available through which the out-band traffic may flow. Therefore, data transfer between the UE 306 and the network may continue uninterrupted.

Figure 4:
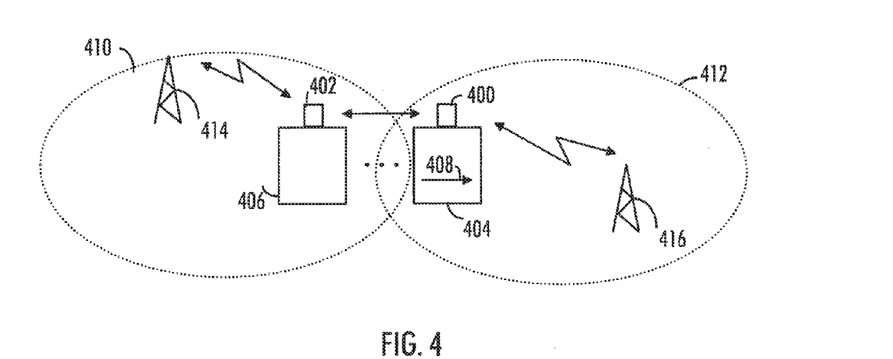
FIG. 4 illustrates a pre-notification of a handover, according to an embodiment.

FIG. 4 depicts a situation where the interconnected relay nodes 400 and 402 exchange information regarding an upcoming handover. Let us assume that the train cars 404 and 406 are moving in the direction as shown with an arrow 408. As the train may be several tens of meters long, the RN 400 may be handed from the cell 410, served by an eNB 414, to the cell 412, served by an eNB 416, before the RN 402 even enters the cell 412. Then the RN 400 may advantageously inform the interconnected RN 402 that a handover is to take place. The RN 402 may thus have more time to prepare for the upcoming handover. Therefore possible user data transfer interruptions due to sudden handover may be avoided.

As explained earlier, the UE may be informed of the availability of the multiple RATs. In an embodiment, after obtaining information about the availability of the out-band radio access in addition to the in-band cellular radio access in one way or another, the UE may select which radio access to apply in communication. The decision may be based on predefined and configured downlink power offset(s) between the local cellular in-band carrier signal and the out-band signal and/or predefined application aware rule(s). This facilitates autonomous RAT selection of UE and fast offloading of advanced UE aboard. The possible knowledge needed by the UE to perform such RAT selection may be configured to the UE aboard via common or dedicated signaling from the RN and/ or with help of ANDSF via either cellular in-band or WiFi (out-band) access. As a result the UE may communicate with the cellular donor system through the relay node, wherein the data transfer to the relay node is performed on an in-band cellular radio access link or on an out-band radio access link.

In an embodiment, only those UEs (advanced UEs) capable of accessing both the in-band cellular radio access and the out-band radio access are informed about the dual in-band/out-band RATs by the relay node of the MR system. Furthermore, UEs aboard may be provided with updated information of local MR cellular access and selection, for example, upon a temporary suspension of MR cell(s) or resumption of MR cell(s) after a temporary suspension, or at any time upon a request from an UE. The network or the ANDSF may provide the information via the relay through either the in-band access link or the out-band access link, as the case may be.

Figure 5:
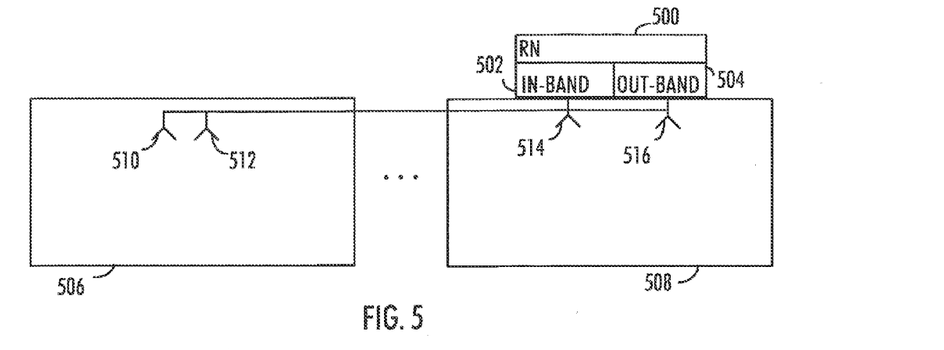
FIG. 5 illustrates a distributed antenna system provided by a relay node, according to an embodiment.

FIG. 5 depicts an alternative solution to providing data to each car of the train when compared to the possibility to deploy a RN to multiple cars 506, 508 of the train. In FIG. 5, there is a single RN 500 in the train capable of providing both the in-band cellular RAT 502 and the out-band RAT 504 to each car 506, 508. This is accomplished by providing the in-band cellular radio access and the out-band radio access through a distributed antenna system (DAS). The DAS comprises multiple remote antenna units (RAU) 510 to 516 distributed throughout the train. The different RAUs 510 to 516 may apply multiple-input multiple-output (MIMO) technology. The RAUs 510 to 516 may be located several tens of meters apart from each other.

Figure 6:
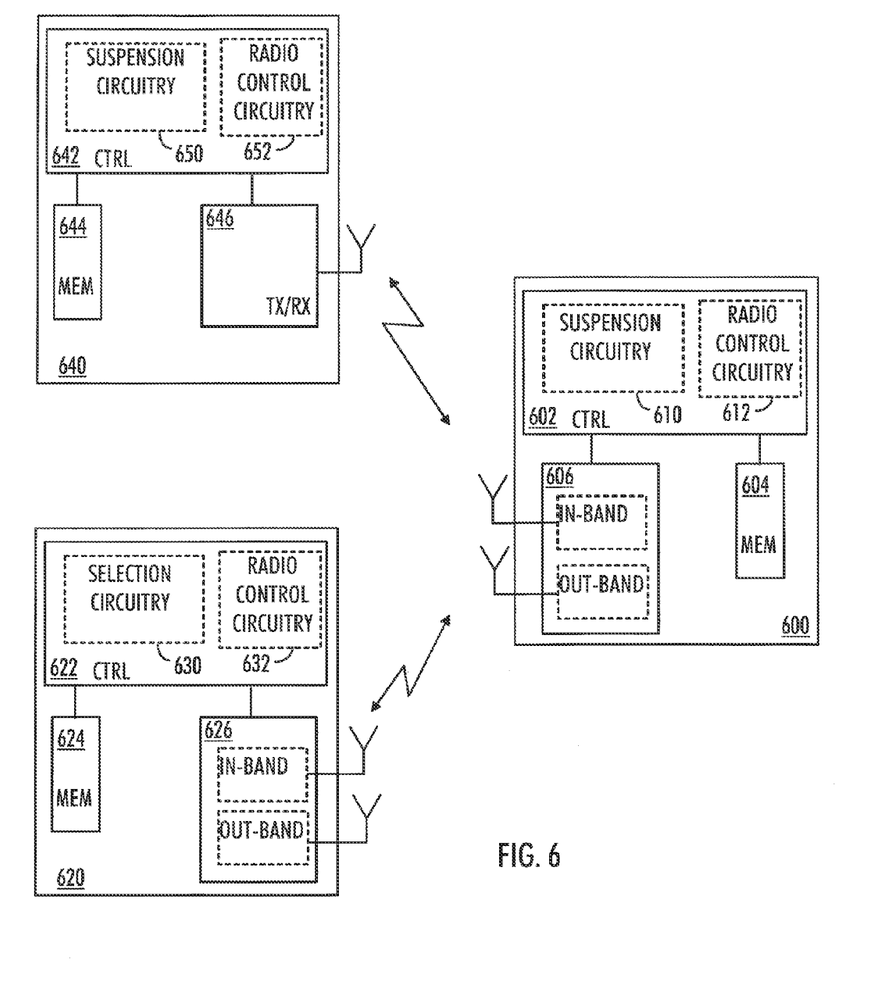
FIG. 6 illustrates apparatuses according to an embodiment.

A very general architecture of apparatuses according to embodiments of the invention is shown in FIG. 6. FIG. 6 shows only the elements and functional entities required for understanding the apparatuses according to an embodiment of the invention. Other components have been omitted for reasons of simplicity. The implementation of the elements and functional entities may vary from that shown in FIG. 6. The connections shown in FIG. 6 are logical connections, and the actual physical connections may be different. The connections can be direct or indirect and there can merely be a functional relationship between components. It is apparent to a person skilled in the art that the apparatuses of FIG. 6 may also comprise other functions and structures.

An apparatus 600, such as a relay node, may comprise a processor 602. The processor 602 may be implemented with a separate digital signal processor provided with suitable software embedded on a computer readable medium, or with a separate logic circuit, such as an application specific integrated circuit (ASIC). The processor 602 may comprise an interface, such as computer port, for providing communication capabilities. The processor 602 may be, for example, a dual-core processor or a multiple-core processor. The apparatus 600 may also comprise a memory 604 connected to the processor 602. However, memory may also be integrated to the processor 602 and, thus, no memory 604 may be required.

The processor 602 may comprise a suspension circuitry 610 for performing suspension of the in-band cellular radio access-related functions, such as turning off the in-band radio access link, reactivation of the in-band radio access, etc.

The processor 602 may comprise a radio control circuitry 612 for performing functions that relate to radio resource management, handover, offloading of users, power control, etc.

The apparatus 600 may further comprise a transceiver (TRX) 606. The TRX 806 may comprise a circuitry to perform in-band cellular access communication as well as cellular access backhaul link(s). The TRX 606 may comprise a circuitry to perform out-band radio access communication with the connected UEs. Both the in-band and the out-band circuitry may be equipped with one or more antennas respectively, which enable connection to and from an air interface.

An apparatus 620, such as a user equipment, may comprise a processor 622. The processor 622 may be implemented with a separate digital signal processor provided with suitable software embedded on a computer readable medium, or with a separate logic circuit, such as an application specific integrated circuit (ASIC). The processor 622 may comprise an interface, such as computer port, for providing communication capabilities. The processor 622 may be, for example, a dual-core processor or a multiple-core processor. The apparatus 620 may also comprise a memory 624 connected to the processor 622. However, memory may also be integrated to the processor 622 and, thus, no memory 624 may be required.

The processor 622 may comprise a selection circuitry 630 for selecting which of the available RATs the apparatus 620 should access to. In order to perform the selection, the apparatus 620 may also comprise a radio control circuitry 632 for performing functions that relate to signal level measurements, power control, etc.

The apparatus 620 may further comprise a transceiver (TRX) 626. The TRX 626 may comprise a circuitry to perform in-band cellular access communication as well as cellular access backhaul link(s). The TRX 626 may also comprise a circuitry to perform out-band radio access communication with the connected UEs. Both the in-band and the out-band circuitry may be equipped with one or more antennas, respectively, which enable connection to and from an air interface. Alternatively, the UE may be equipped with only one, either the in-band circuitry or the out-band circuitry.

The apparatus 640, such as an ANDSF or a core network element, may comprise a processor 642. The processor 642 may be implemented with a separate digital signal processor provided with suitable software embedded on a computer readable medium, or with a separate logic circuit, such as an application specific integrated circuit (ASIC). The processor 642 may comprise an interface, such as computer port, for providing communication capabilities. The processor 642 may be, for example, a dual-core processor or a multiple-core processor.

The apparatus 640 may also comprise a memory 644 connected to the processor 642. However, memory may also be integrated to the processor 642 and, thus, no memory 644 may be required. The processor 642 may comprise suspension circuitry 650 for deciding whether to perform suspension of the in-band cellular radio access or not. The suspension circuitry 650 may also be responsible of deciding when to reactivate the in-band RAT. The suspension circuitry 650 may also trigger informing of the RN or the UEs about the suspension. The apparatus 640 may also comprise a radio control circuitry 652 for performing functions relating to radio resource management, handover, power control, etc.

The apparatus 640 may further comprise a transceiver (TRX) 646 equipped with one or more antennas for accessing the cellular backhaul link between the apparatus 640 and a relay node.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Figure 7:
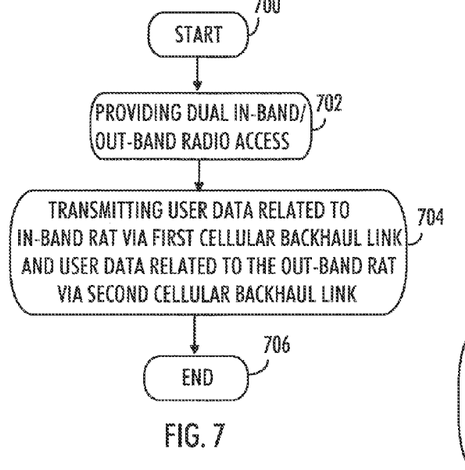
FIG. 7 shows a method according to an embodiment.

FIG. 7 depicts a method of enhancing the reliability of UE data communication. The method starts in step 700. In step 702, an in-band cellular radio access and an out-band radio access are provided for at least one user equipment within the coverage area via at least one in-band cellular radio access link and at least one out-band radio access link, respectively. In step 704, transmission of user data related to the in-band cellular radio access via a first cellular radio access backhaul link and of user data related to the out-band radio access via a second cellular radio access backhaul link to at least one donor cellular system takes place. The method ends in step 706.

Figure 8:
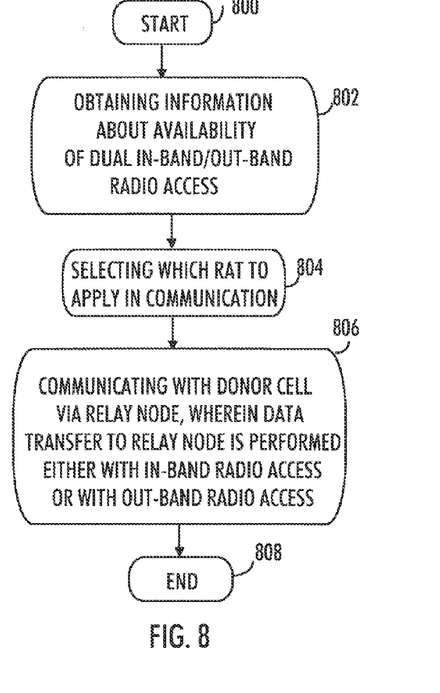
FIG. 8 shows another method according to an embodiment.

FIG. 8 depicts a method of UE for performing communication in a multi-RAT situation. The method begins in step 800. In step 802 information about the availability of an out-band radio access in addition to an in-band cellular radio access is obtained. In step 804, the UE selects which radio access to apply in communication and in step 806, the UE communicates with a cellular donor system through a relay node, wherein the data transfer to the relay node is performed on an in-band cellular radio access link or on an out-band radio access link. The method ends in step 808.

Figure 9:
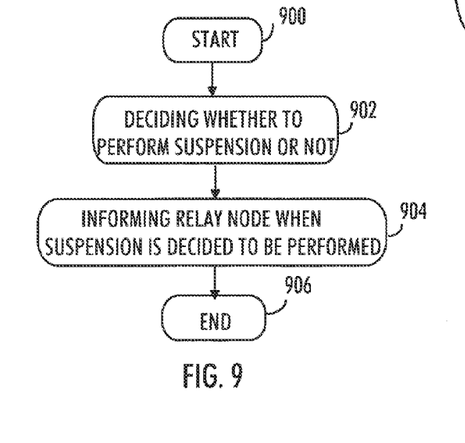
FIG. 9 illustrates yet another method according to an embodiment.

FIG. 9 depicts a method of ANDSF or any network element capable of assisting in the cell selection. The method aims in triggering the suspension of the in-band cellular radio access. The method starts in step 900. In step 902 it is decided whether or not to perform suspension of an in-band cellular radio access from a relay node, wherein a relay node provides the in-band cellular radio access and an out-band radio access. In step 904, the relay node is informed about the suspension of the in-band cellular radio access when the suspension is decided to be performed. The method ends in step 906.

The embodiments of the invention offer many advantages. For example, with respect to the backward compatibility, the MR arrangement provides regular cellular access to all users, possibly with a out-band offloading capability and, at the same time, autonomous cooperative dual in-band/out-band (multi-RAT) availability for any advanced UE with such a radio access capabilities. In an embodiment the UE is enabled with a cognitive radio capability coupled with multi-path transmission control protocol (TCP) for instance.

The techniques and methods described herein may be implemented by various means. For example, these techniques may be implemented in hardware (one or more devices), firmware (one or more devices), software (one or more modules), or combinations thereof. For a hardware implementation, the apparatuses of FIG. 6 may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rear-ranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus for performing the any of the tasks of FIGS. 1 to 9 comprises means, such as processing means, transmitting means, storing means, etc., which are configured to perform any of the tasks of FIGS. 1 to 9.

Embodiments of the invention may be implemented as computer programs according to the embodiments of the invention. The computer programs comprise instructions for executing a computer process for improving the reliability of the communication. The computer program implemented in the respective apparatus may carry out, but is not limited to, the tasks related to FIGS. 1 to 9.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method, comprising:
providing an in-band cellular radio access technology and an out-band radio access technology for use by at least one user equipment within the coverage area via at least one in-band cellular radio access link and at least one out-band radio access link, respectively,
wherein the in-band cellular radio access link is via a first radio access technology,
wherein the out-band radio access link is via a second radio access technology,
wherein the first radio access technology is different from the second radio access technology, and
wherein the in-band cellular radio access technology and the out-band radio access technology operate on two different frequency bands; and
transmitting user data related to the in-band cellular radio access technology via a first cellular radio backhaul link and user data related to the out-band radio access technology via a second cellular radio backhaul link to at least one donor cellular system.

2. The method of claim 1, further comprising:
interacting with at least one interconnected relay node providing dual in-band/out-band radio access in order to perform radio control-related functionalities with the interconnected at least one node.

3. The method of claim 1, further comprising: providing information about the availability of the out-band radio access technology and the in-band cellular radio access technology to at least one of the following: at least one user equipment and at least one donor cellular system.

4. The method of claim 1, further comprising: suspending the in-band cellular radio access link temporarily.

5. The method of claim 4, further comprising:
maintaining connection to at least one of the at least one cellular donor system in order to obtain at least radio control-related services.

6. The method of claim 4, further comprising: informing at least one user equipment communicating on the in-band cellular radio access technology that suspension of the in-band cellular radio access link is to take place.

7. The method of claim 6, wherein the informing takes place via an out-band radio access link.

8. The method of claim 4, further comprising: offloading at least one user equipment communicating on the in-band cellular radio access technology to the out-band radio access technology before the suspension takes place.

9. The method of claim 4, further comprising: re-allocating, for the period of the suspension, the at least one cellular radio backhaul link otherwise carrying user data related to the in-band cellular radio access technology to carry user data related to the out-band radio access technology.

10. The method of claim 1, further comprising: providing the use of both in-band cellular radio access technology and the out-band radio access technology through a distributed antenna system.

11. A computer program product embodied on a non-transitory distribution medium readable by a computer and comprising program instructions which, when loaded into an apparatus, execute the method according to claim 1.

12. A method, comprising:
obtaining by a user equipment information about an availability of using both an out-band radio access technology and an in-band cellular radio access technology,
wherein the in-band cellular radio access technology is a first radio access technology,
wherein the out-band radio access technology is a second radio access technology,
wherein the first radio access technology is different from the second radio access technology, and
wherein the in-band cellular radio access technology and the out-band radio access technology operate on two different frequency bands; and
selecting by the user equipment which radio access technology to apply in communication; and
communicating with a cellular donor system, by the user equipment, through a relay node, wherein the data transfer to the relay node is performed on an in-band cellular radio access link or on an out-band radio access link.

13. A computer program product embodied on a non-transitory distribution medium readable by a computer and comprising program instructions which, when loaded into an apparatus, execute the method according to claim 12.

14. A method, comprising:
deciding by a network element whether or not to perform suspension of using an in-band cellular radio access technology from a relay node, wherein the relay node provides the in-band cellular radio access link and an out-band radio access link,
  wherein the in-band cellular radio access link is via a first radio access technology,
  wherein the out-band radio access link is via a second radio access technology,
  wherein the first radio access technology is different from the second radio access technology, and
  wherein the in-band cellular radio access technology and the out-band radio access technology operate on two different frequency bands; and
informing the relay node, by the network element, about the suspension of the in-band cellular radio access link when the suspension is decided to be performed.

15. A computer program product embodied on a non-transitory distribution medium readable by a computer and comprising program instructions which, when loaded into an apparatus, execute the method according to claim 14.

16. An apparatus, comprising:
at least one processor and at least one memory including a computer program code, wherein the at least one memory and the computer program code are configured to, with the at least one processor, cause the apparatus at least to:
provide an in-band cellular radio access technology and an out-band radio access technology for use by at least one user equipment within the coverage area via at least one in-band cellular radio access link and at least one out-band radio access link, respectively,
  wherein the in-band cellular radio access link is via a first radio access technology,
  wherein the out-band radio access link is via a second radio access technology,
  wherein the first radio access technology is different from the second radio access technology, and
  wherein the in-band cellular radio access technology and the out-band radio access technology operate on two different frequency bands; and
transmit user data related to the in-band cellular radio access technology via a first cellular radio backhaul link and user data related to the out-band radio access technology via a second cellular radio backhaul link to at least one donor cellular system.

17. The apparatus of claim 16, wherein the apparatus is further caused to:
interact with at least one interconnected node providing dual in-band/out-band radio access technology in order to perform radio control-related functionalities with the interconnected at least one node.

18. The apparatus of claim 16, wherein the apparatus is further caused to:
provide information about the availability of using the out-band radio access technology in addition to the in-band cellular radio access technology to at least one of the following: at least one user equipment and at least one donor cellular system.

19. The apparatus of claim 16, wherein the apparatus is further caused to:
suspend the in-band cellular radio access link temporarily.

20. The apparatus of claim 19, wherein the apparatus is further caused to:
maintain connection to at least one of the at least one cellular donor system in order to obtain at least radio control-related services.

21. The apparatus of claim 19, wherein the apparatus is further caused to:
inform at least one user equipment communicating on the in-band cellular radio access technology that suspension of the in-ban cellular radio access link is to take place.

22. The apparatus of claim 21, wherein the informing takes place via an out-band radio access link.

23. The apparatus claim 19, wherein the apparatus is further caused to:
offload at least one user equipment communicating on the in-band cellular radio access technology to the out-band radio access technology before the suspension takes place.

24. The apparatus of claim 19, wherein the apparatus is further caused to:
re-allocate, for the period of the suspension, the at least one cellular radio backhaul link otherwise carrying user data related to the in-band cellular radio access technology to carry user data related to the out-band radio access technology.

25. The apparatus of claim 16, wherein the apparatus is further caused to:
provide use of both the in-band cellular radio access technology and the out-band radio access technology through a distributed antenna system.

26. An apparatus, comprising:
at least one processor and at least one memory including a computer program code, wherein the at least one memory and the computer pro-gram code are configured to, with the at least one processor, cause the apparatus at least to:
obtain information about an availability of using both an out-band radio access technology and an in-band cellular radio access technology;
select which radio access technology to apply in communication,
  wherein the in-band cellular radio access technology is via a first radio access technology,
  wherein the out-band radio access technology is via a second radio access technology,
  wherein the first radio access technology is different from the second radio access technology, and
  wherein the in-band cellular radio access technology and the out-band radio access technology operate on two different frequency bands; and
communicate with a cellular donor system through a relay node, wherein the data transfer to the relay node is performed on an in-band cellular radio access link or on an out-band radio access link.

27. An apparatus, comprising:
at least one processor and at least one memory including a computer program code, wherein the at least one memory and the computer program code are configured to, with the at least one processor, cause the apparatus at least to:
decide whether or not to perform suspension of using an in-band cellular radio access technology from a relay node, wherein the relay node provides the in-band cellular radio access link and an out-band radio access link,
  wherein the in-band cellular radio access link is via a first radio access technology, wherein the out-band radio access link is via a second radio access technology, wherein the first radio access technology is different from the second radio access technology, and wherein the in-band cellular radio access technology and the out-band radio access technology operate on two different frequency bands; and inform the relay node about the suspension of the in-band cellular radio access link when the suspension is decided to be performed.

* * * * *